March 1, 1949.  J. E. STRIETELMEIER  2,463,439
SANDWICH GRILL
Filed Oct. 12, 1945  2 Sheets-Sheet 1
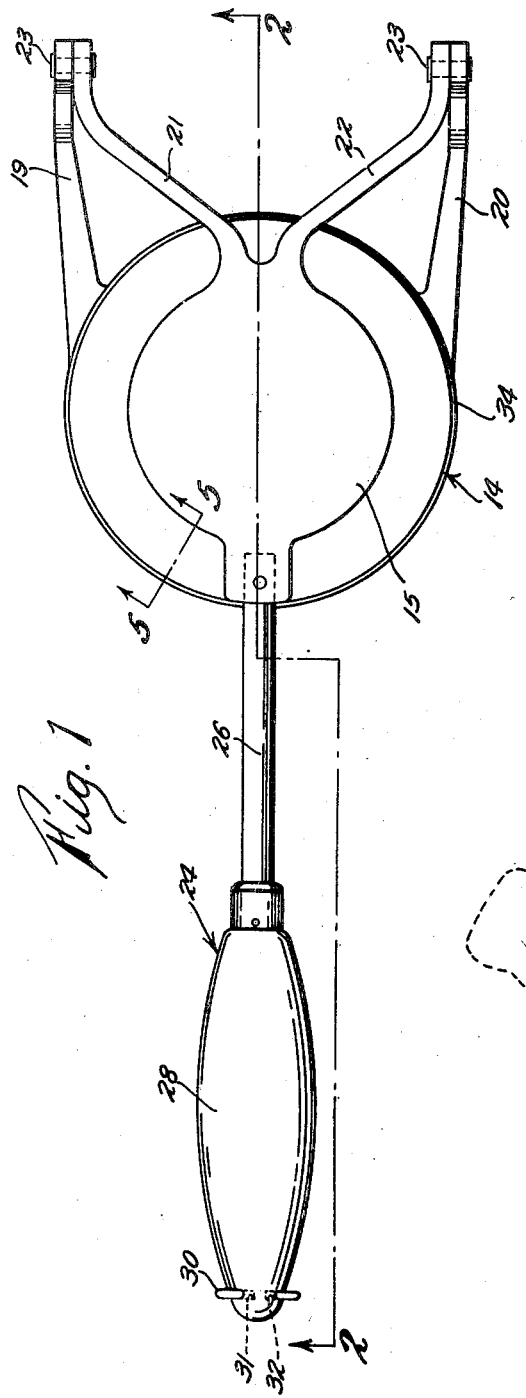
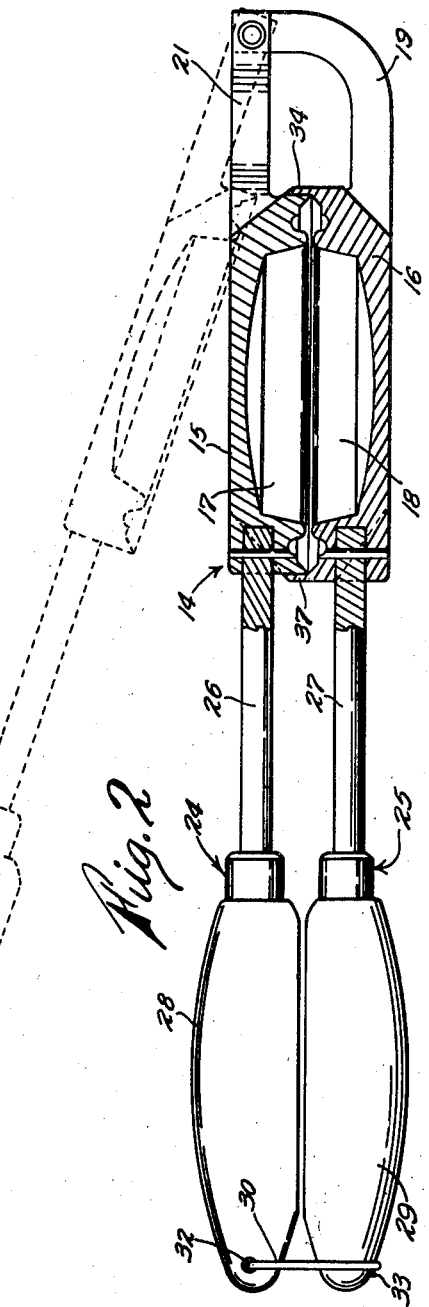
INVENTOR.
John E. Strietelmeier
BY Lucille Strietelmeier
ADMINISTRATRIX
Murray, Sackhoff & Paddack
ATT'YS March 1, 1949. J. E. STRIETELMEIER 2,463,439
SANDWICH GRILL
Filed Oct. 12, 1945 2 Sheets-Sheet 2

INVENTOR.
John E. Strietelmeier
BY Lucille Strietelmeier
ADMINISTRATRIX
Murray, Jackhoff & Paddack
ATT'YS Patented Mar. 1, 1949

2,463,439

UNITED STATES PATENT OFFICE 2,463,439

SANDWICH GRILL

John E. Strietelmeier, deceased, late of Cincinnati, Ohio, by Lucille Strietelmeier, administratrix, Cincinnati, Ohio Application October 12, 1945, Serial No. 621,898

6 Claims. (Cl. 99—372)

The present invention relates to improvements in sandwich toasting grills and is particularly directed to a hinged, sectional unit for making a toasted sandwich under heat and pressure from two pieces of a baked dough product and a filling material therebetween.

An object of the invention is to provide in a unit for toasting and interiorly heating a filled sandwich made from two baked dough pieces a means for locating said filling in the center of the sandwich and for joining and sealing the marginal edges of the pieces by heat and pressure to preclude the escape of the filling from the finished product.

Another object of the invention is to provide in a grill having the foregoing structure a means for trimming the baked dough pieces as the mold plates therefor are moved into operative toasting positions, said trimming means being an integral part of the joining and sealing means for the device.

A further object of the invention is to provide a strong and serviceable sandwich grill for making, under heat and pressure, a toasted, thoroughly warmed product having a filling sealed therein.

Another object of the invention is to provide in a toasting grill having the foregoing characteristics a means for exerting a constant pressure on the mold plates therefor whilst the grill is being heated so that an effective seal is formed between the outer sandwich pieces to prevent leakage of the sandwich filling from the finished product.

These and other objects are attained by the means set forth in the following specification and in the accompanying drawings which illustrate a preferred embodiment of my invention, and in which:

Fig. 1 is a top plan view of the sandwich grill.

Fig. 2 is a cross-sectional view taken on line 2—2 of Fig. 1, the dotted lines shown therein indicating the relative opened positions of the hinged mold plates of the grill.

Figure 6:
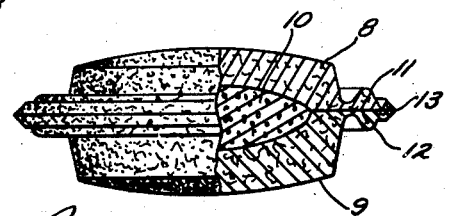
Fig. 6 is a side elevational view of the finished product made with the grill shown in Figs. 1–5, parts thereof being shown in central cross-section.

In general the sandwich grill is adapted to make a filled, edible product having a toasted outer surface and a thoroughly warmed interior body portion and contents. As indicated in Fig. 6, the sandwich comprises two pieces 8 and 9 of a baked dough product such as slices of bread, or the like, which are provided with a suitable filling material 10 therebetween. The slices are joined along their adjacent marginal portions 11 by a pressed portion 12 and a sealed marginal edge 13.

To produce this sandwich in the illustrated grill one slice of bread, or the like, is placed in the lowermost mold plate and pressed down in the middle to form a concavity therein for receiving the filling material. A slice of bread is then placed upon the slice containing the filling material and the mold plates brought into the position indicated in full lines in Fig. 2, whereupon the grill is placed over a fire for toasting and heating purposes.

Referring now to the specific features of the invention, the grill 14 comprises a pair of hinged mold plates 15 and 16 each having a centrally disposed depression or concavity 17 and 18 respectively formed in the adjacent faces of said plates. As most clearly indicated in Fig. 2, these depressions are relatively deep and are disposed in axial alignment when the grill is in its closed position.

The mold plate 16 has a pair of spaced arms 19 and 20 extending from the lower rear side of its body portion and made integral therewith. The outer ends of these arms are turned upwardly and pivotally engage arms 21 and 22 respectively extending rearwardly from the mold plate 15. A hinged connection is formed between the arms for each mold plate by pins 23 which freely pass through the ends of adjacent arms.

Handles 24 and 25 extend from each of the mold plates 15 and 16 respectively and each comprises an elongated, resilient shaft 26 and 27 which are anchored at their inner ends to the plates and have fastened to their outer ends suitable hand gripping portions 28 and 29 respectively made of suitable heat insulating material. The hand gripping portions are rigidly held in closed position by means of a ring 30 rotatably fastened in opposed annular recesses 31 and 32 formed in the end of the handle 24 and at its free end engages the handle 25. The ring is held in said position by a detent 33 extending from the free end of said handle.

Figure 3:
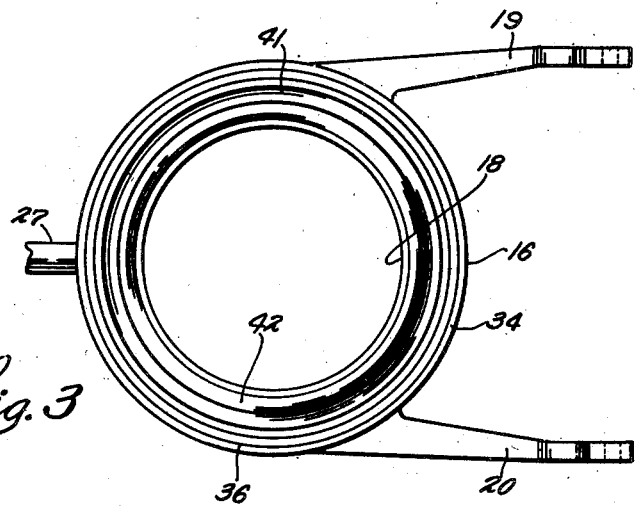
Fig. 3 is a plan view of the interior face for one of the grill mold plates.
Figure 4:
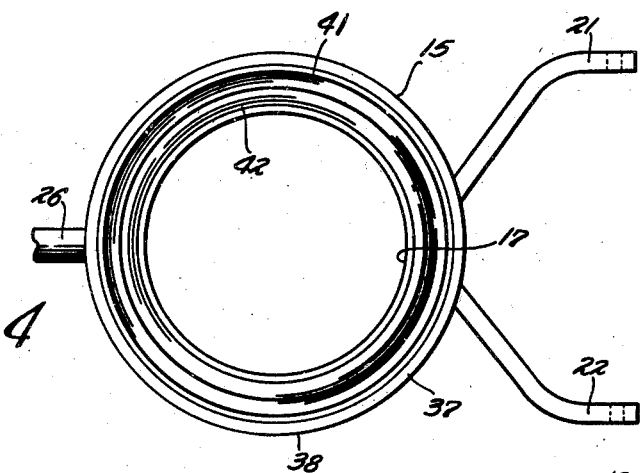
Fig. 4 is a plan view of the interior face of the other grill mold plate.
Figure 5:
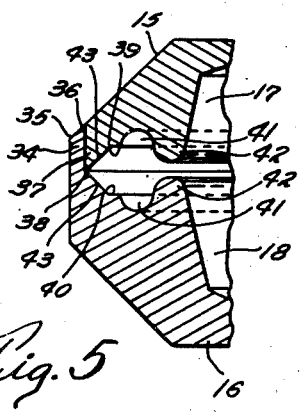
Fig. 5 is an enlarged, cross-sectional view taken on line 5—5 of Fig. 1.

The mold plate 16 has a marginal flange 34 extending from its adjacent face and which terminates in a beveled edge 35 which forms a knife edge 36 between it and the interior vertical wall of said flange (Fig. 5). A cooperating flange 37 is formed around the margin of the mold plate 15 and is provided with a knife edge 38, said edges being adapted to trim the overhanging portions of the baked dough pieces from their main body portions when the mold plates are moved from their opened to their closed, flange overlapping positions. A shallow, annular portion 39 and 40 is formed in each plate intermediate its depression and its marginal flange, and as most clearly illustrated in Fig. 5, each shallow portion may have a centrally disposed, annular groove 41 formed therein and adjacent inwardly spaced ridges 42. Tapered portions 43 and 44 extend from the shallow portions 39 and 40 respectively in the mold plates and terminate at the bases of their respective flanges. When the mold plates are brought into their closed position, the flat portions press together the adjacent marginal portions of the baked dough pieces to preclude the escape of the sandwich filling material whilst the tapered portions of the mold plates press the marginal edges of the pieces into a compact form where, upon the application of heat, the marginal edges of the pieces are sealed together.

What is claimed is:

1. In a device of the class described the combination of a pair of hinged mold plates each having a centrally disposed depression formed in an adjacent face for receiving two pieces of a baked dough product and a filling therebetween, a handle extending from a side of each plate opposed to its hinged side, a marginal flange extending from the adjacent faces of each plate into overlapping relationship, a shallow portion formed in each plate intermediate the depression and the flange and cooperating to press together the adjacent marginal portions of the pieces around the filling, and a tapered portion for each plate extending from the shallow portion to the base of the flange and adapted to cooperate for sealing the edges of the pieces.

2. In a device of the class described the combination of a pair of hinged mold plates each having a deep centrally disposed depression formed in an adjacent face, a handle extending from a side of each plate opposed to its hinged side, a continuous, peripheral flange extending from each of the adjacent faces of each plate into overlapping relationship, a relatively shallow portion formed in each plate intermediate the depression and the flange, and a tapered portion for each plate extending from the shallow portion to the flange.

3. In a device of the class described the combination of a pair of hinged mold plates each having a centrally disposed depression formed in an adjacent face for receiving two slices of bread and a filling therebetween, a handle extending from a side of each plate opposed to its hinged side, a marginal flange extending from the adjacent face of each plate into overlapping relationship, a knife edge formed on each flange and adapted to form a cooperating bread-trimming means, a shallow portion formed intermediate the depression and flange on each plate and cooperating to press together the adjacent marginal portions of the bread slices around the filling, and a tapered portion extending from the shallow portion to the base of the flange for each plate and adapted to seal the slices around their trimmed margins.

4. In a device of the class described the combination of a pair of heated mold plates each having a centrally disposed depression formed in an adjacent face for receiving two pieces of a baked dough product and a filling therebetween, means for hinging the mold plates, a resilient, pressure-imparting handle extending from a side of each plate opposed to its hinged side, a marginal flange extending from each of the adjacent faces of the plate into overlapping relationship, a shallow portion formed in each plate intermediate the depression and the flange and adapted to press together the adjacent marginal portion of the pieces around the filling, and a tapered portion for each plate extending from the shallow portion to the base of the flange and cooperating to seal the pieces under pressure.

5. In a device of the class described the combination of a pair of hinged mold plates each having a deep, centrally disposed depression formed in an adjacent face for receiving a slice of a baked dough product with a filling therebetween, a handle extending from a side of each plate opposed to its hinged side, a peripheral flange extending from the adjacent face of each plate into overlapping relationship with the opposed flange to form cooperative trimming means for excess of the dough product as the plates are being brought into closed plate positions, and a relatively shallow portion formed in each plate intermediate its flange and depression, said shallow portions cooperating in plate closed positions to press together the marginal portions of the slices of the baked dough product.

6. In a device of the class described the combination of a pair of hinged mold plates each having a deep, centrally disposed depression formed in an adjacent face for receiving a slice of a baked dough product with a filling therebetween, a handle extending from a side of each plate opposed to its hinged side, a peripheral flange extending from the adjacent face of each plate into overlapping relationship with the opposed flange to form cooperative trimming means for excess of the dough product as the plates are being brought into closed plate positions, a relatively shallow portion formed in each plate intermediate its flange and depression, said shallow portions cooperating in plate closed positions to press together the marginal portions of the slices of the baked dough product, and an inclined wall formed around the outer edge of the shallow portion of each plate and converging outwardly to the interior engaging surfaces of the plates.

LUCILLE STRIETELMEIER,
*Administratrix of the Estate of John E. Strietelmeier, Deceased.*

REFERENCES CITED

The following references are of record in the file of this patent:

UNITED STATES PATENTS

| Number | Name | Date |
|---|---|---|
| 1,336,734 | Graff | Apr. 13, 1920 |
| 1,493,444 | Burch | May 6, 1924 |
| 1,969,361 | Fajen | Aug. 7, 1934 |
| 2,346,839 | Harriss et al. | Apr. 18, 1944 |